Oct. 18, 1966
H. R. PERSON
3,280,376
LIGHTNING ARRESTER
Filed Aug. 15, 1963
2 Sheets-Sheet 1
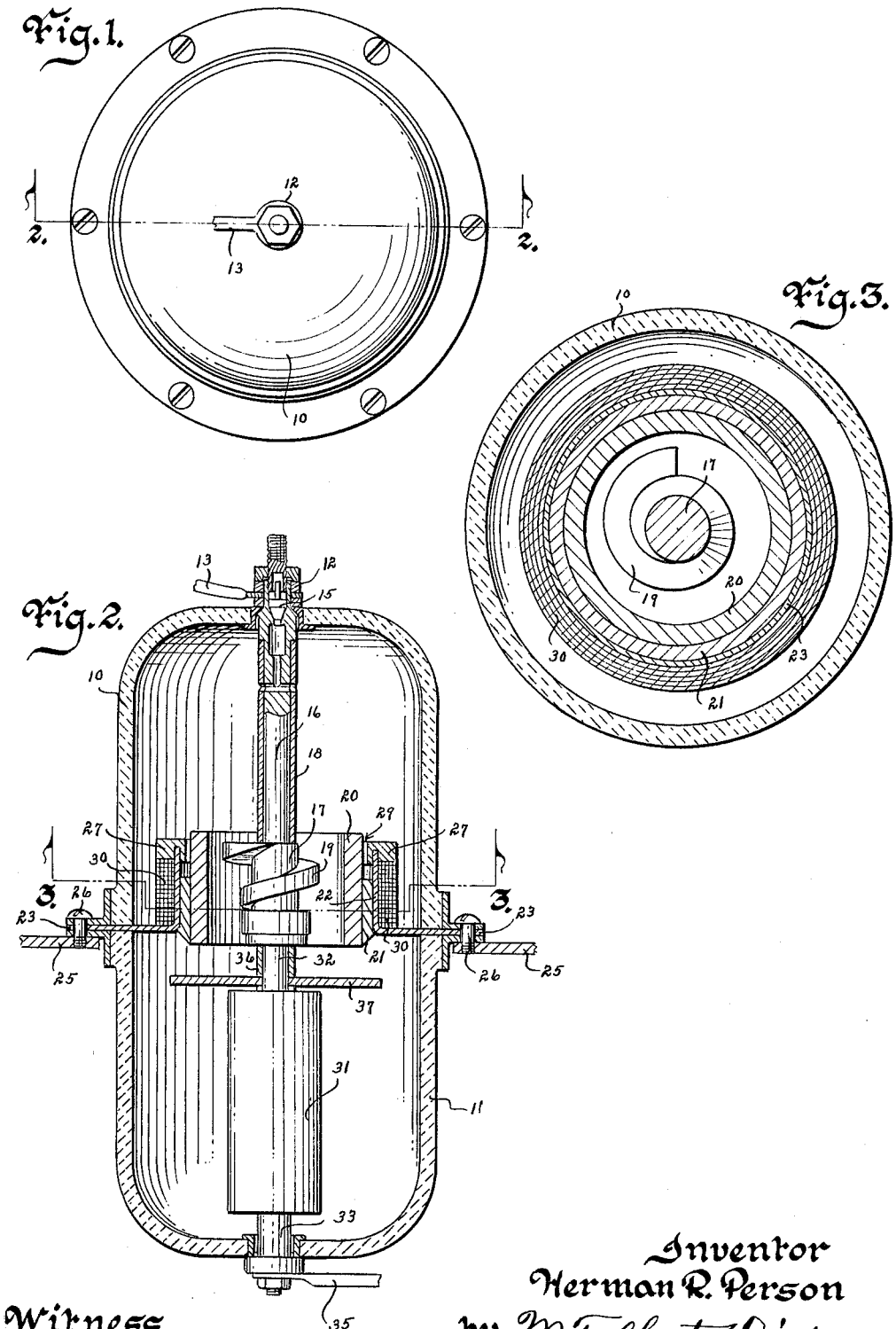
Witness
Edward P. Seeley
Inventor
Herman R. Person
by M. Talbert Dick
Attorney Inventor
Herman R. Person
by M. Talbert Dick
Attorney

United States Patent Office 3,280,376
Patented Oct. 18, 1966

3,280,376
LIGHTNING ARRESTER
Herman R. Person, Columbus, Nebr., assignor to Dale Electronics Inc., Columbus, Nebr.
Filed Aug. 15, 1963, Ser. No. 303,469
5 Claims. (Cl. 317—61)

This application is a continuation-in-part of copending application Serial No. 6,503, filed February 3, 1960, now abandoned.

This invention relates to lightning arresters and more particularly to a device for aircraft that will by-pass a plurality of lightning strikes away from certain electronic equipment of the aircraft.

Aircraft in flight is often struck by lightning but usually neither the aircraft per se nor the personnel are seriously harmed. However, it is quite common for electronic equipment, such as radio, radar, electrical controls, and like, to be seriously damaged by the lightning. Such losses obviously are not only costly but the aircraft is deprived of certain of its electronic equipment.

Some effort herebefore has been made to provide an aircraft lightning arrester which will stand at least more than one lightning stroke and such a device is disclosed in my issued Patent #2,916,667, under date of December 8, 1959, on a Lightning Arrester. While the structure of the lightning arrester disclosed in this patent has enjoyed a universal commercial success, the electrodes do rapidly disintegrate from a series of lightning strokes.

Therefore, one of the principal objects of my invention is to provide a multiple lightning stroke arrester that reduces the progressive disintegration of the electrodes.

More specifically, the object of this invention is to provide a lightning arrester that spirals the electrical flash between the electrodes, thereby greatly increasing the useful life of the electrodes.

A further object of this invention is to provide a lightning arrester for the protection of electronic equipment of aircraft that is light in weight.

A still further object of this invention is to provide an aircraft lightning arrester that may be easily and quickly installed on the aircraft.

A still further object of this invention is to provide a lightning diverter for the electronic equipment of aircraft that permits the visual observation of its various elements to determine the extent of damage caused by one or more lightning strikes.

A still further object of my invention is to provide a lightning arrester that is sealed against dust, moisture and like foreign matter.

A still further object of this invention is to provide a lightning arrester that prevents the breakdown voltage of the spark between the electrodes from changing with each successive lightning stroke by-passed.

A still further object of my invention is to provide a lightning arrester for aircraft that is not seriously affected by temperature changes.

A still further object of my invention is to provide an arrester that will withstand high temperatures up to two hundred degrees centigrade.

A still further object of this invention is to provide a lightning arrester that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a top plan view of my lightning arrester.

FIG. 2 is a vertical longitudinal sectional view of my device taken on line 2—2 of FIG. 1;

FIG. 3 is an enlarged cross-sectional view of my lightning arrester taken on line 3—3 of FIG. 2 and more fully illustrates its construction;

Figure 4:
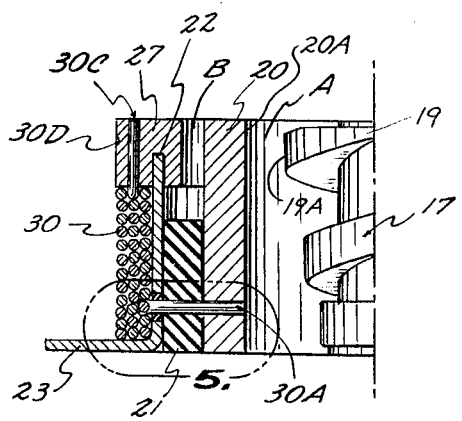
FIG. 4 is an enlarged fragmentary sectional view of my lightning arrester showing a portion of FIG. 2 at an enlarged scale.
Figure 5:
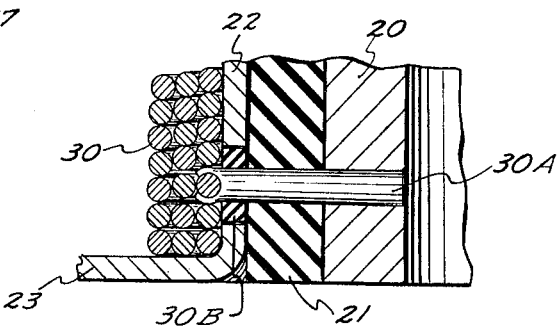
FIG. 5 is an enlarged scale sectional view of a portion of FIG. 4.

My device, and which I will now describe in detail, may be considered a magnetic lightning arrester in that it is self-induced. Substantially all of the component parts are in a sealed glass or like container. In the drawings this container consists of two clamped together glass or like shells designated by the numerals 10 and 11. Extending through the center top of the top shell 10 is the antenna terminal 12. The lead wire 13 is adapted to extend from the terminal 12 to the antenna (not shown). Any suitable means may be used to hermetically seal the antenna terminal at the point where it extends through the top of the shell 10. However, I do provide a valve means 15 within the terminal so that the inside of the container formed by the parts 10 and 11 may be pressurized. By pressurizing the inside of the container the R.F. voltage breakdown of the gap between the two first encountered terminals may be adjusted. This adjustment is accomplished by adjusting the pressure which affects the linear positive charge in breakdown voltage. After the proper pressure has been obtained within the container, the valve is sealed by any suitable means such as shown in FIG. 2 and requires no further adjustment. The antenna terminal extends downwardly in the longitudinal center of the sealed container in the form of a rod 16, to electrically contact and support the helical electrode 17, as shown in FIG. 2. Obviously, the antenna terminal, its rod shaft 16, and helical electrode 17 are capable of conducting electricity. In order to keep the lightning arc on the spark gaps, I provide a sleeve 18 of refractory material around the major length of the rod portion 16. The helical electrode 17 consists of a base center cylindrical portion having a downwardly spiralling or helical flange 19 embracing its periphery, as shown in FIG. 3. The diameter of flange 19 decreases from top to bottom. Spaced apart from, and embracing the electrode 17, is a collar 20 which serves as the receiving electrode. The first gap will therefore be between the upper portion of helical flange 19 of the electrode 17 and the collar electrode 20. The numeral 21 designates an insulation collar embracing the lower portion of the collar electrode 20. The numeral 22 designates an electricity conducting sleeve engaging and embracing the insulation 21. This sleeve 22 extends above the insulation 21 and also has a peripheral flange 23 that extends outwardly and between the two container portions 10 and 11. This flange 23 is grounded by any suitable means to the aircraft 25. If desired, bolt means, screws or like 26 may be used for not only clamping the two shells of the container 10 and 11 together but also for securing the unit to the aircraft and also electrically connecting the flange 23 to the aircraft, as shown in FIG. 2. The numeral 27 designates a ring of electricity conducting material secured on the top portion of the sleeve 22. This ring 27 embraces but is spaced apart from the collar 20 to provide a second spark gap 29. The numeral 30 designates a wire coil embracing the sleeve 22 and directly below the ring 27, as shown in FIG. 3.

Figure 6:
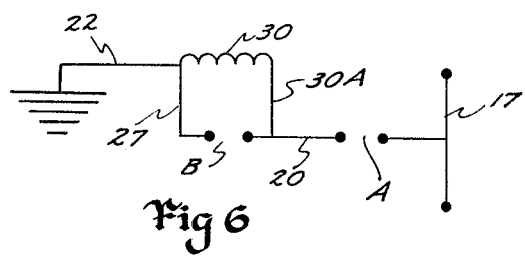
FIG. 6 is a schematic electrical drawing showing the circuitry of the components of my device.

A pin 30A is frictionally imbedded in a suitable aperture in collar 20 and extends outwardly therefrom through insulation collar 21 and sleeve 22. A bushing 30B insulates the pin 30A from sleeve 22. The outer end of the pin 30A is electrically connected to coil 30 in any convenient manner, and is preferably connected to one end of the coil. One end of the coil 30 can be crimped into a slot on the outer end of the pin 30A, as shown in FIG. 6 to effect the connection between the pin and the coil. The other end of the coil is inserted into a suitable aperture 30C in ring 27, and the ring is thereupon crimped at 30D to hold the coil in the aperture. As shown in FIG. 4, the coil 30 is comprised of a plurality of continuous horizontal turns of a single wire.

The numeral 31 designates a capacitor in the lower portion of the container. This capacitor is connected to the bottom of the electrode 17 by a rod portion 32. The lower end of the capacitor 31 communicates through the center bottom of the shell 11 by virtue of the rod portion 33. The point where the rod 33 extends through and from the shell 11 is sealed by any suitable means so that the container unit will be hermetically sealed. The numeral 35 designates a lead wire connected to the free outer end of the rod portion 38 and is adapted to extend to and be connected with the electric equipment to be protected from lightning strokes. The numeral 36 designates a sleeve of refractory material embracing the rod portion 32. Embracing the rod portion 32 and extending over the top of the capacitor 31 is a plate 37 of refractory material. The parts 18, 36 and 37 are of any suitable non-electrical conductive material to shield against electrical arcs. The capacitor is an ordinary electrical unit except that it has a resistance extended across it such that it forms an integrated single unit. The recommended values of the resistance and capacitance are one megohm and .002 mfd. respectively.

The practicable operation of my lightning arrester is as follows:

In case of a lightning stroke, the lightning current will flow from the terminal 12 downwardly on the rod portion 16 to the electrode 17. When the current reaches the spiral gap at the electrode 17, it causes the capacitor to charge up which increases the voltage between the electrodes 17 and 20. When the breakdown value is reached, an arc jumps between the closest or upper part of the spiral flange 19 and the collar electrode 20. The gap spanned by the arc is designated "A" in FIGS. 4 and 6. After the spark has reached the collar electrode 20, it must jump the second gap 29 (designated "B" in FIGS. 4 and 6) to reach the electrode ring 27. This ring 27 is grounded to the aircraft through the sleeve 22 and its flange 23. Current is carried to the coil 30 through pin 30A from collar 20. The magnetic flux set up by this current in the coil causes the arc between the electrodes 17 and 20 to rotate down the spiral gap and away from the top or initiating point. This action prevents the breakdown voltage of the spark gap from changing. Since the spark moves downwardly away from the point of ignition 19A, the point of ignition at the upper part of flange 19 (and the opposing surface 20A at the top of collar 20) are not continually exposed to this spark. This serves to protect and preserve the ignition point from damage, and the spark gap distance is always constant at the ignition level. It is extremely important that the spark gap "A" between the ignition point 19A on the upper portion of flange 19 and the opposing surface 20A of the collar 20 be constant regardless of the number of times the unit is struck by lightning. By forcing the spark downwardly on the flange 19 by the magneic flux of coil 30, the points 19A and 20A are preserved, and thus the gap therebetween is held constant. These points are further preserved by the fact that helical flange 19 increases the "vertical" length of the spark to spread it over a greater area, rather than allowing it to be concentrated at the upper peripheries of collar 20 and flange 19. By preserving these elements and the shape thereof by diluting and distracting the spark, the unit obviously has a much longer life. The magnetic flux also causes the arc between the electrodes 20 and 27 to rotate so that the metal will not be destroyed or distorted. Because the arcs are made to rotate, the desired effect is obtained which is increasing the total number of lightning strokes the arrester can withstand. The capacitor and resistance unit serve to maintain a low impedance to the RF current from the transmitter to the antenna so the impedance will block the flow of lightning current. This causes the voltage to build up and arc over the gaps causing the lightning current to go to the frame of the aircraft. The resistor of one megohm across the capacitor allows the static electricity built up on the antenna to flow to the frame of the aircraft without causing radio noise. Under normal conditions, the incoming signal will pass from the antenna, through the lead 13, thence by way of the parts 16, 17, 32, 31, 33 and 35 to point of use. Therefore, a lightning strike will only momentarily interrupt the normal receiving or sending of signals.

The above described phenomenon is shown schematically in FIG. 6. The current starts from electrode 17 and flange 19 where it jumps the gap A between point 19A on flange 19 and point 20A on collar 20. From there, the current divides and goes into the coil through pin 30A, and across the spark gap B (or 29) into sleeve 22. The spark gap B has a constant voltage developed across it because of the inherent characteristics of an electric arc. This constant voltage drives a current through the coil 30.

Others have used the magnetic principle for lightning arresters. These lightning arresters break down into two basic types. One is by using a permanent magnet and two concentric rings which cause the spark to rotate around the ring, thereby, not allowing the arc to stay in one place to burn it. The disadvantage of this system is that the permanent magnet may become demagnetized by the high current; and, secondly, that the initiating point for the arc is also the point where the arc can run around; and the small damage done to the rings by the arc running around could possibly change the spark over voltage. The second basic type of lightning arrester uses a coil to produce the magnetic field and a pair of V shaped electrodes. The V shaped electrodes are situated such that there is a V shaped gap so that the arc can spark at a point in the gap when the electrodes are close together and then move to the gap where it becomes larger. This movement of the arc is caused by the magnetic field created by the current flowing in the coil. This disadvantage of this system is that the arc becomes stationary when it finally reaches the end of the spark gaps and will cause deterioration of the gaps at that point.

The lightning arrester herein described has all the advantages of both systems and the disadvantages are eliminated. This is accomplished by using the spiral gap and the coil to produce the magnetic field. In this manner I do not have the disadvantage of the arc taking place on the arc initiating surface, but still have the advantage of the arc continuously rotating, thereby not disrupting the gaps.

Some changes may be made in the construction and arrangement of my lightning arrester without departing from the real spirit and purpose of my invention, and it is my intention to cover by my claims, any modified forms of structure or use of mechanical equivalents which may be reasonably included within their scope.

I claim:
1. In a lightning arrester,
 a container,
 an electrical conductor extending into the top of said container and adapted to be electrically connected to an antenna,
 a capacitor in said container operatively electrically connected by one end to said electrical conductor and having its other end adapted for operative connection to the instruments of an aircraft,
an electrode electrically connected to said electrical conductor above said capacitor,
said electrode having a downwardly extending helical flange,
a collar in said container embracing in spaced relation said electrode,
a coil means adapted to be electrically connected to said collar and adapted to be connected to ground so that an electrical spark which spans the gap between the upper portion of said electrode and said collar will cause an electrical current in said coil means, whereupon the resulting magnetic flux from the energized coil will force said spark downwardly on the downwardly extending helical flange.

2. The device of claim 1 wherein the diameter of said flange becomes progressively smaller from top to bottom.

3. The device of claim 1 wherein an electro-conductive ring is imposed on the top of said coil in spaced relation to said collar.

4. In a lightning arrester,
a container,
an electrical conductor extending into the top of said container and adapted to be electrically connected to an antenna,
a capacitor in said container operatively electrically connected by one end to said electrical conductor and having its other end adapted for operative connection to the instruments of an aircraft,
an electrode electrically connected to said electrical conductor above said capacitor,
said electrode having a downwardly extending helical flange,
an electro-conductive circular flange secured to said container and extending around said electrode in spaced relation thereto, and being adapted for connection to an electrical ground,
a coil means horizontally wound on said circular flange,
an electro-conductive ring in electrical contact with one end of said coil and the upper end of said circular flange,
an insulative means on the inside of said circular flange,
an electro-conducting collar secured to said insulative means and surrounding said electrode in spaced relation thereto,
means electrically connecting said collar to said coil, wherein an electrical spark which spans the gap between the upper portion of said electrode and said collar will cause an electrical current in said coil means, whereupon the resulting magnetic flux from the energized coil will force said spark downwardly on the downwardly extending helical flange.

5. The device of claim 4 wherein the diameter of the flange on said electrode becomes progressively smaller from top to bottom.

References Cited by the Examiner

UNITED STATES PATENTS

| 2,825,008 | 2/1958 | Kalb | 317—74 |
| 2,906,922 | 9/1959 | Huber | 315—59 |
| 2,906,925 | 9/1959 | Yonkers | 317—62 |

FOREIGN PATENTS

| 645,827 | 11/1950 | Great Britain. |
| 788,224 | 12/1957 | Great Britain. |

MILTON O. HIRSHFIELD, *Primary Examiner.*
R. V. LUPO, *Assistant Examiner.*